Figure 1:
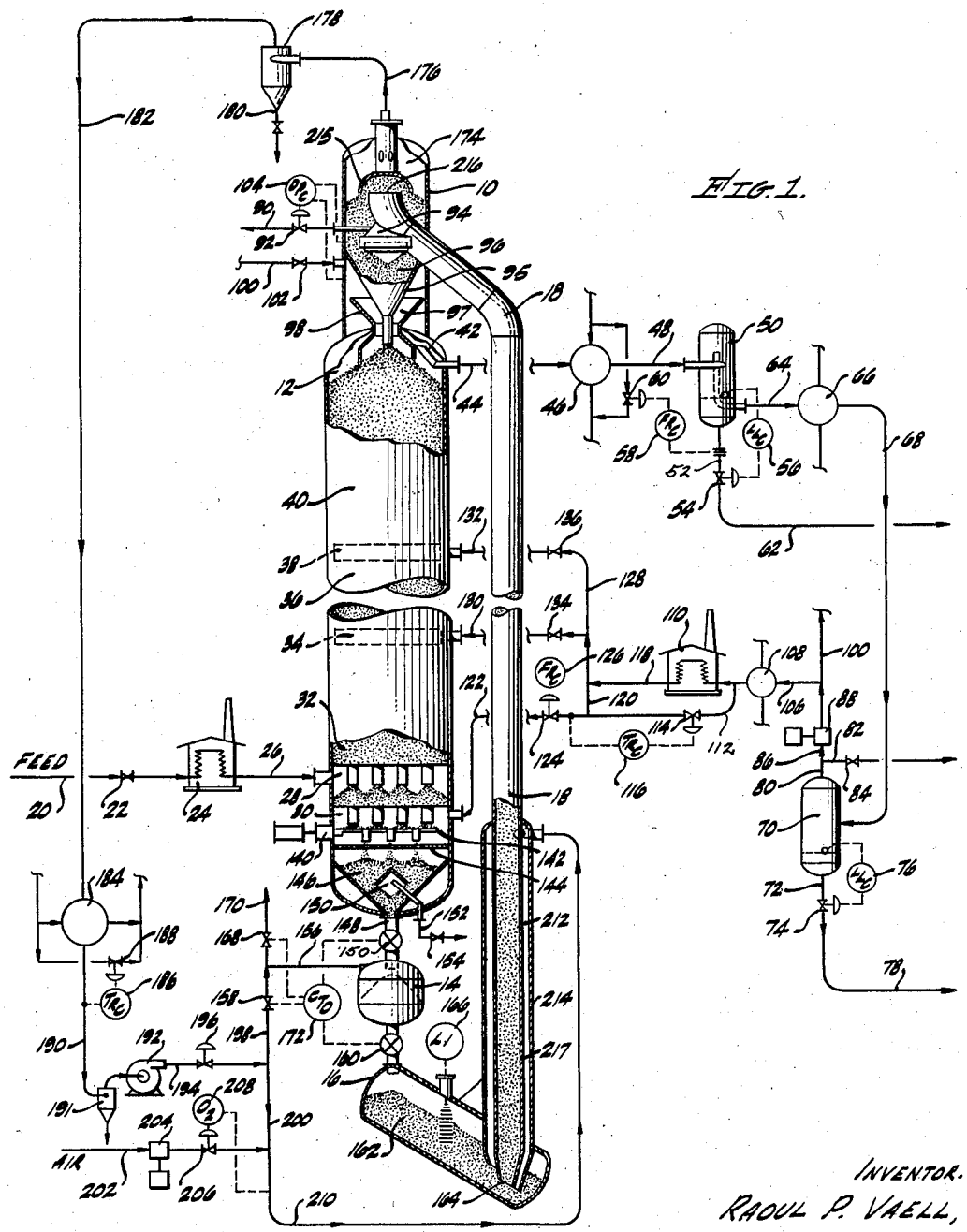

INVENTOR.
RAOUL P. VAELL,
BY
AGENT.

June 23, 1959 R. P. VAELL 2,891,908
HYDROCARBON CONVERSION APPARATUS AND PROCESS
Filed July 12, 1954 2 Sheets-Sheet 2
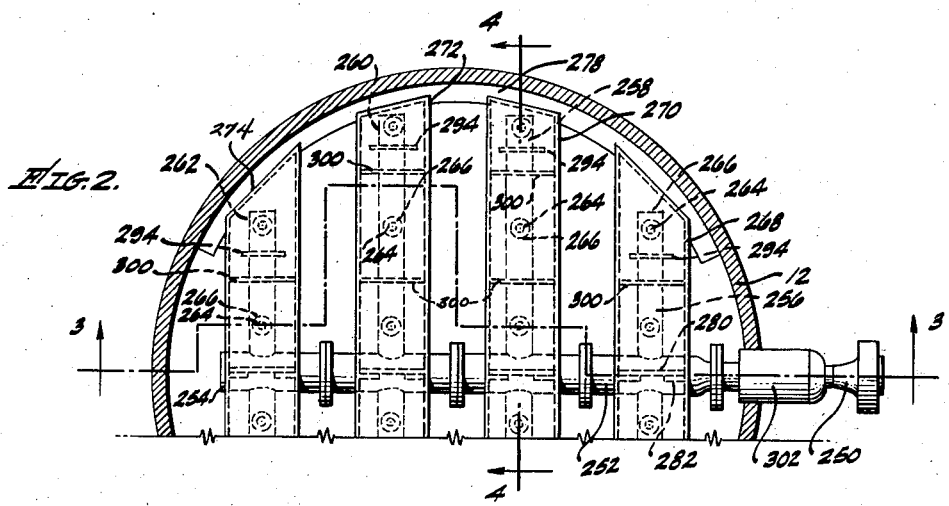
FIG. 2.
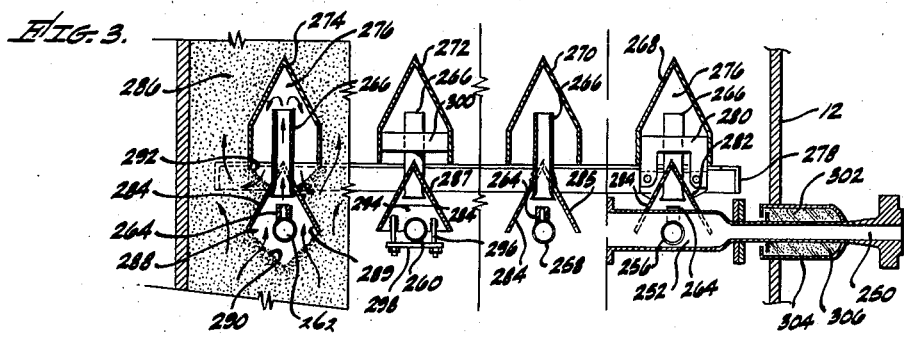
FIG. 3.
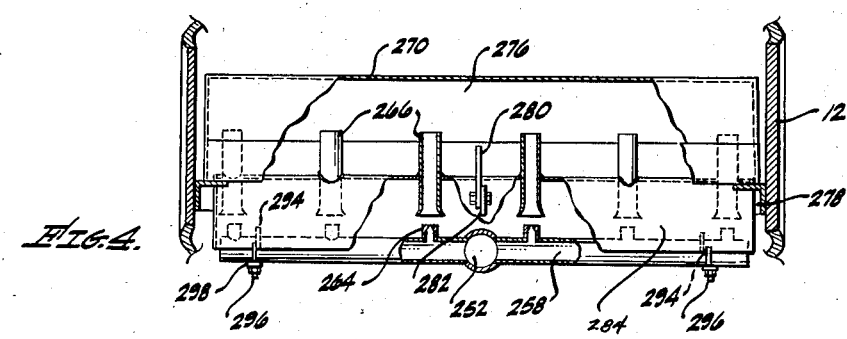
FIG. 4.
INVENTOR.
RAOUL P. VAELL,
BY
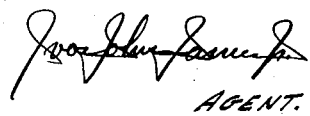
AGENT.

United States Patent Office 2,891,908
Patented June 23, 1959

2,891,908

HYDROCARBON CONVERSION APPARATUS AND PROCESS

Raoul P. Vaell, Los Angeles, Calif., assignor to Union Oil Company of California, Los Angeles, Calif., a corporation of California Application July 12, 1954, Serial No. 442,769

11 Claims. (Cl. 208—165)

This invention relates to a continuous process and apparatus for the contacting of a fluid with a granular solid contact material and in particular relates to an improved process and apparatus for hydrocarbon conversions wherein a hydrocarbon stream is contacted with a stream of granular solid contact material, such as a granular solid hydrocarbon conversion catalyst, which material is recirculated successively through a contacting or reaction zone and through a solids regeneration or reheating zone. One specific feature of the present invention is an improved method and apparatus for maintaining temperature control in the fluid-solids contacting zone by the injection of a fluid, mixing it thoroughly with at least part of the fluid passing through the contacting zone, such mixing being effected within the contacting zone but out of contact with the solid contact material, and then contacting the mixture at the desired temperature with further quantities of the solid material.

Hydrocarbon fractions in particular and many other fluid reactant streams in general are advantageously treated under reaction conditions of temperature and pressure in the presence of a solid granular contact material, which may or may not have catalytic activity, to produce fluid products having improved properties. In the field of petroleum refining, hydrocarbon fractions boiling between the limits of about 75° F. and 1000° F. and including the light and heavy naphthas or gasolines and the light and heavy gas-oil fractions, are treated at relatively high pressures and temperatures in the presence of solid contact materials to coke, crack, desulfurize, denitrogenate, hydrogenate, dehydrogenate, reform, aromatize, isomerize, or polymerize such hydrocarbon fractions to produce products having desirable properties which particularly well suit them for hydrocarbon cracking feed, gasoline blending stock, solvents, or diesel or jet engine fuels and the like.

In many contacting processes, a substantial change in temperature of the fluid occurs during passage through the contacting zone due to endothermic or exothermic reactions. For example, in the straight desulfurization of hydrocarbons such as gas-oil or naphtha in the presence of hydrogen and a catalyst such as cobalt molybdate substantial temperature increases as high as 200° F. are experienced. In gasoline reforming in the presence of hydrogen and a catalyst such as cobalt molybdate and under different temperature and pressure conditions, temperature decreases as high as 100° F. occur in the conversion zone due to the endothermic nature of hydrocarbon aromatization reactions. The conventional equipment and process steps for compensating for such temperature changes are so complex that few if any commercial fluid-solids contacting processes have been designed, built, and operated to control them.

It is an object of this invention to provide an improved solids-fluid contacting process in which effective control of fluid temperature throughout the contacting zone is effected by the injection of additional fluid thereinto.

It is a more specific object to effect such temperature control in hydrocarbon conversions wherein the hydrocarbon is contacted with a solid granular material such as a catalyst.

Another specific object is to control the temperature within a solids-fluid contacting zone by injecting at least one auxiliary fluid stream into the contacting zone at an intermediate point, thoroughly mixing said stream and at least part of the fluid being contacted, such mixing being effected within the conversion zone but out of contact with the solid contact material, and then passing the mixture at a different temperature in contact with further quantities of the solid material.

It is an additional object of this invention to provide an improved apparatus for accomplishing the foregoing objects.

Other objects and advantages of the present invention will become apparent to those skilled in the art as the description thereof proceeds.

The control of temperature within the contacting or reaction zone is accomplished by the injection of at least one fluid stream at an intermediate point along the length of the zone. The temperature of the injected stream is higher than the desired reaction temperature for endothermic reactions and lower for exothermic reactions. The flow rate of the injected fluid is correlated with the reactant fluid flow rate and the degree to which the reactions are exothermic or endothermic so as to maintain the desired average temperature in the reaction or contacting zone. The number of injection points used is determined by the degree of uniformity of temperature required in the reaction zone.

The fluid used for temperature control in this invention is injected into one or a plurality of jet pumps maintained within the reaction zone. At least a part of the reacting fluids are disengaged from the bed of solid contact material, and are then mixed with the injected fluid out of contact with solid material to avoid overheating or overcooling the solids, and the homogeneous mixture then flows into contact with further solid material at the desired temperature. These disengaging, mixing, and re-engaging steps may be repeated one or more times along the length of the reaction or contacting column to maintain the desired temperature profile therein.

In hydrocarbon conversion reactions, such as catalytic desulfurization, denitrogenation, reforming, and the like which are effected in the presence of a recycled stream containing hydrogen, at least a portion of this recycle stream may be heated or cooled to temperatures above or below the desired reaction temperature respectively and injected as one or more separate streams into the reaction zone to effect temperature control as hereinafter more fully described.

The separate mixing of the reacting fluids and the injected fluid stream out of contact with the solid contact material has been found to result in the elimination of local overheating or overcooling of the solid material at the injection point, elimination of vapor phase coking and degradation of the reacting fluids when hydrocarbons are treated, and avoidance of side reactions such as coking of hydrocarbons on the solid contact material at the injection point.

The present invention will be more readily understood by reference to the following description of the attached drawings wherein:

Figure 1 is a combination process flow diagram and detailed elevation view in partial cross section of the contacting and solids regeneration apparatus of this invention showing schematically the intermediate fluid injection points, and which is described in terms of a specific example as applied to the continuous reforming and desulfurization of a petroleum naphtha, Figure 2 is a detailed plan view of the fluid injection and mixing system shown generally as elements 34 and 38 in Figure 1, and Figures 3 and 4 are detailed elevation views in cross section of the structure shown in Figure 2.

The permissible operating conditions for naphtha reforming and desulfurization are from 700 to 1100° F., from 50 to 2000 p.s.i.g., and from 500 to 10,000 s.c.f. of hydrogen per barrel of naphtha feed. The following example gives the specific operating conditions of one installation.

Referring now more particularly to Figure 1, the apparatus consists essentially of catalyst separator and pretreating chamber 10 into which the regenerated catalyst is discharged, naphtha reforming column 12 through which the catalyst passes downwardly as a moving bed by gravity, catalyst pressuring chamber 14 receiving spent catalyst from reforming chamber 12, induction chamber 16 into which the spent pressured catalyst is discharged, and conveyance-regeneration chamber 18 through which the spent catalyst is conveyed and regenerated and discharged for recirculation into separator chamber 10.

The apparatus of this invention as shown in the drawing is for the catalytic reforming and desulfurization of 1100 barrels per stream day of a petroleum naphtha having the following properties:

TABLE I

Naphtha feed

| | |
|---|---|
| Boiling range, ° F. | 240–420 |
| A.P.I. gravity, degrees | 46.3 |
| Sulfur, weight percent | 0.578 |
| Nitrogen, weight percent | 0.020 |
| Knock rating (F–1 clear) | 61.8 |
| Naphthenes, volume percent | 42 |
| Aromatics, volume percent | 15 |

This naphtha feed is introduced through line 20 at a rate of 1100 barrels per day controlled by valve 22 and is preheated by exchange with hot regeneration gas recycle in interchanger 184 described subsequently, and then is further heated and vaporized in fired heater 24. The naphtha vapor is introduced through transfer line 26 at a temperature of 900° F. and a pressure of 405 p.s.i.g. into naphtha engaging zone 28 in column 12. A primary stream of recycle gas containing hydrogen is introduced through primary recycle gas engaging zone 30 at a rate of 1700 M s.c.f. per day and at a temperature of 900° F. The mixture of naphtha vapor and hydrogen passes upwardly through primary reforming zone 32 countercurrently to the downflowing bed of cobalt molybdate catalyst. Herein the cyclization of paraffin hydrocarbons takes place to form naphthenes and the endothermic aromatization of the naphthene hydrocarbons takes place and results in a temperature decrease. To maintain an approximately constant temperature profile throughout reaction column 12, a secondary hydrogen recycle stream is introduced into secondary recycle gas engaging and injection zone 34 at a temperature of 1150° F. and at a rate of 1130 M s.c.f. per day to increase the temperature of the reacting mixture to about 910° F. The thus reheated mixture passes countercurrently to the catalyst through secondary reforming zone 36 wherein a further temperature decrease takes place due to the continuing endothermic aromatization reactions. A tertiary stream of recycle gas at 1150° F. is introduced into tertiary recycle gas engaging and injection zone 38 at a rate of 1290 M s.c.f. per day to raise the reactant mixture temperature again to about 910° F. The mixture then continues upwardly through tertiary reforming zone 40 from which the effluent is removed from disengaging zone 42 at a temperature of about 880° F. and at 400 p.s.i.g. through line 44.

The structural details of injection zones 34 and 38 are shown in Figures 2, 3, and 4 described below.

The effluent vapor is passed through interchanger 46 wherein heat is recovered in depropanizing the product and for preheating the naphtha feed and is thereby cooled to a temperature of 450° F. which is just sufficiently below the dew point of the effluent to effect a partial condensation of polymeric high boiling hydrocarbon materials having substantial gum forming tendencies when employed as internal combustion engine fuels. The cooled and partially condensed effluent then passes through line 48 and is introduced into separator 50 which is preferably a cyclone known as the Webre cyclone. Herein the partial condensate, amounting to a very small part of the total effluent, is separated from the vapor and is removed through line 52 at a rate controlled by valve 54 in accordance with liquid level controller 56. Flow recorder controller 58, which is adjusted to maintain a predetermined rate of flow of condensate through line 52, operates coolant bypass valve 60 so that the hot effluent flowing through line 44 is cooled sufficiently to partially condense that desired proportion of the reactor effluent.

The preferred proportion so condensed is a very minor amount ranging from 0.1% up to about 10% by volume. Preferably this proportion is between about 0.1% and about 5%, and in the experimental verification of the present invention it has been found that partial condensation of about 2.2% by volume was sufficient to substantially eliminate the so-called heavy ends or polymer from the effluent so as to avoid the usual necessity for rerunning the depropanized liquid product, which invariably results in some thermal degradation, forming additional high boiling polymeric materials.

In the present invention, slightly more than 2% by volume of the effluent is condensed and is removed at a rate of 22 barrels per day by means of line 62. This material contains reformed gasoline boiling below about 420° F. and accordingly is returned for redistillation with the material from which the naphtha feed to the process of this invention is prepared. This step, not shown for sake of simplicity in the drawing, is entirely conventional and effects a recovery of approximately 14.5 barrels of reformed gasoline boiling range product boiling below about 420° F.

The uncondensed portion of the effluent flows from cyclone 50 at a temperature of about 450° F. through line 64 and is further cooled and condensed in interchanger 66 in which heat is recovered by heat exchange with the hydrogen recycle gas as subsequently described. The condensed effluent together with the uncondensed hydrogen recycle gas flows through line 68 into product separator 70 in which the uncondensed gases are separated from the process product. The reformed naphtha product is removed through line 72 at a rate of 1113 barrels per day controlled by valve 74 in response to liquid level controller 76. This liquid is sent by means of line 78 to a conventional depropanizer, not shown, wherein propane and lighter hydrocarbon gases are separated to produce the reformed naptha product of this invention. This product is produced at a rate of 1023 barrels per day and has the following properties:

TABLE II

Reformed naphtha product

| | |
|---|---|
| Boiling range, °F. | 94–435 |
| A.P.I. gravity | 51.7 |
| Sulfur, weight percent | 0.004 |
| Nitrogen, weight percent | — |
| Knock rating (F–1 +3 cc. TEL) | 95 |
| Naphthenes, volume percent | 14 |
| Aromatics, volume percent | 40 |

The uncondensed portion of the effluent consists essentially of the hydrogen-containing recycle gas which is removed from separator 70 by means of line 80 and because of the net production of hydrogen in the process, the excess portion is bled from the system through line 82 at a rate of 140 M s.c.f. per day controlled by valve 84. Part or all of this gas may be employed as fuel in the fired heaters in the process if desired.

The remaining recycle gas is passed through line 86 and is compressed from 375 p.s.i.g. to 425 p.s.i.g. in recycle gas compressor 88. Part of this compressed recycle gas is passed as a regenerated catalyst pretreating gas through line 100 at a rate of 165 M s.c.f. per day controlled by valve 102 into separator and catalyst pretreating chamber 10. This pretreating gas is introduced below and around cone-shaped baffle 95 and passes therefrom downwardly through the annular space 97 constituting a pretreating gas engaging zone within the lower periphery of baffle 98 and then directly into the bed of regenerated catalyst within baffle 98 at the top of chamber 10. A secondary portion of this gas passes upwardly through sealing leg 99 and pretreating zone 96 countercurrently to the regenerated catalyst. By means of this countercurrent passage of gas the catalyst is pretreated with hydrogen to reduce the higher oxides of cobalt and molybdenum formed during regeneration to the lower oxides. The pretreating gas, along with the secondary portion of regeneration gas subsequently described coming down from the top of the lift line with the regenerated catalyst, is removed from beneath baffle or pretreating and sealing gas disengaging zone 94 through line 90 controlled by valve 92. The primary portion of the pretreating gas introduced through line 100 and passed downwardly through pretreating gas engaging zone 97 passes through the solids within baffle 98 and radially outwardly below the lower periphery of baffle 98 and is disengaged from the catalyst bed with the total reactor effluent in disengaging zone 42 at points around the lower periphery of baffle 98 and through line 44, and acts as a seal gas preventing the upflow of reactor effluent into the pretreating chamber 10. The secondary streams of pretreating gas and regeneration gas are removed from separator chamber 10 from disengaging zone 94 through line 90 at a rate of 205 M s.c.f. per day controlled by valve 92 which in turn is actuated by differential pressure controller 104 to maintain a positive pressure differential between the top and the bottom of catalyst pretreating zone 96, that is, the pressure above cone-shaped baffle 95 is slightly less than the pressure below it and within baffle 98.

The remaining portion of the compressed recycle gas flows at a rate of 4120 M s.c.f. per day through line 106 and is preheated in interchanger 108 to 350° F. in exchange with the reactor effluent after polymer removal (interchanger 66).

Of this preheated recycle gas, 3460 M s.c.f. per day are further heated in fired preheater 110 to a temperature of 1150° F., and 660 M s.c.f. per day passed through bypass line 112 at a rate controlled by valve 114 in response to temperature recorder controller 116. The primary hydrogen recycle gas, introduced into engaging zone 30 at a rate of 1700 M s.c.f. per day and at 900° F., is produced by mixing 1040 M s.c.f. per day of 1150° F. hydrogen flowing through lines 118 and 120 with the 660 M s.c.f. per day of cooler hydrogen from line 112 and this material is then introduced through line 122 into the primary recycle gas engaging zone 30 at a rate controlled by valve 124 in response to flow recorder controller 126.

The remaining recycle gas at 1150° F. passes through manifold 128 and constitutes the secondary and tertiary recycle gas streams mentioned previously. These streams are introduced into engaging zones 34 and 38 through lines 130 and 132 at rates of 1130 M s.c.f. per day and 1290 M s.c.f. per day controlled by valves 134 and 136 respectively.

The spent hydrocarbonaceous catalyst passes downwardly through the column 12 at a rate controlled by solids feeder and stripper 140 which is provided with a reciprocating tray 142 and a lower stationary tray 144 so that upon reciprocation of tray 142 a substantially constant volumetric withdrawal of spent catalyst uniformly throughout the cross-sectional area of column 12 is achieved. Spent catalyst from feeder 140 accumulates as bed 146 which constitutes a surge volume, the level of which rises and falls as granular solids are withdrawn from the bottom of the column periodically through outlet 148 controlled by motor valve 150.

The spent solids are thus discharged into pressuring chamber 14 when it is depressured to about 400 p.s.i.g. causing a displacement gas to flow upwardly through outlet 148 into the bottom of reactor 12. A second seal gas comprising a mixture of this last-named gas and a small portion of the primary recycle gas stream, which passes downwardly through solids feeder 140, is removed from disengaging zone 150 through line 152 at a rate of 140 M s.c.f. per day controlled by valve 154. This gas is mixed with the spent catalyst pretreating gas removed from the upper part of the column through line 90 and is employed as fuel.

The spent granular solids in pressuring chamber 14 are raised in pressure to 430 p.s.i.g. by the introduction of regeneration recycle gas through manifold 156 upon the opening of valve 158 described below. Following this pressuring step, valve 160 is opened and the pressured solids are discharged by gravity into induction chamber 16 to maintain the downwardly flowing bed 162 of spent granular catalyst to be conveyed and regenerated so as to submerge the lower inlet opening 164 of the conveyance-regeneration chamber. Level indicator 166 is provided to indicate the solids level of bed 162.

Valve 160 is then closed, motor valve 168 is opened, and pressuring vessel 14 is depressured from 430 pounds to about 400 pounds by the discharge of gas through lines 156 and 170. Valve 168 is then closed and valve 150 is reopened to remove additional spent catalyst and the solids pressuring cycle is repeated. The operation of valves 150, 158, 160, and 168 is controlled in sequence by cycle timer operator 172 so as to receive solids, pressure, discharge solids, and depressure at a rate sufficient to charge solids into induction chamber 16 at a rate equal to the solids circulation rate set by solids feeder 140.

Referring now to solids pretreater and separator 10, spent conveyance-regeneration gases are disengaged from the conveyed solids and a primary or major portion collecting in space 174 is removed therefrom through line 176 at a rate of 1612 M s.c.f. per day and a temperature of 984° F. A secondary or minor stream passes downwardly with the solids and enters pretreating and seal gas disengaging zone 94 as described. This primary gas portion is passed into solids separator 178 wherein any catalyst fines elutriated from the catalyst stream in separator 10 are removed from the regeneration gas recycle. These solids are removed from separator 178 by means of line 180. The solids-free recycle gas then flows through line 182 through heat exchanger 184 in exchange with raw naphtha feed referred to above and is therein cooled to a temperature of about 640° F. This temperature is controlled by temperature recorder controller 186 which operates bypass valve 188 so as to control the naphtha coolant passing through interchanger 184. The cooled recycle gas passes through line 190 and is compressed to 430 p.s.i.g. in compressor 192. This recycle gas then flows through line 194 at a rate controlled by valve 196 and is divided into a solids pressuring stream flowing through line 198 to pressure solids in chamber 14, and a conveyance-regeneration stream flowing from line 200.

An oxygen-containing gas, such as air, is introduced via line 202. It is compressed to 433 p.s.i.g. in compressor 204 and is introduced at a rate of 123 M s.c.f. per day controlled by valve 206 in response to oxygen recorder controller 208 for combination with the compressed conveyance-regeneration recycle gas flowing through line 200.

The combined oxygen-containing conveyance-regeneration gas, which may contain from about 0.1 to about 10% oxygen and preferably from 0.5 to 5.0% oxygen, then passes at a temperature of about 646° F. and at a rate of 1735 M s.c.f. per day through line 210 tangentially into the upper portion of regenerator heat exchange zone 212. This zone is contained within the annulus between the lower portion of conveyance-regeneration conduit 18 and jacket 214 which surrounds concentrically the lower portion of the conveyance-regeneration conduit. The regeneration gas passes downwardly through zone 212 and is preheated therein by means of the exothermic heat of regeneration liberated within the lower part of conveyance-regeneration zone 18 to a temperature of about 706° F. This preheated gas is injected directly into induction chamber 16 at a point below the level of the spent catalyst to be conveyed, it passes into inlet 164 of the conveyance-regeneration zone, and then upwardly therethrough at a rate sufficient to effect conveyance and regeneration of the spent catalyst. The regenerated catalyst is discharged against baffle 215 which applies a force against the mass of catalyst issuing from conveyance-regeneration conduit 18 and maintains the upwardly moving catalyst at a bulk density substantially equal to the static bulk density thereof. As stated above, the major part of the coke burn-off from the catalyst occurs in the lower or first part of the conveyance-regeneration zone and a substantial part of this endothermic heat is transferred through the conveyance conduit wall to preheat the conveyance-regeneration gas recycle and to keep the inner conveyance-regeneration conduit wall 217 cool. All of the net exothermic heat of regeneration however is removed as sensible heat in the conveyance-regeneration recycle, with the exception of usual heat losses.

The spent granular catalyst is substantially completely regenerated while passing upwardly through the conveyance-regeneration conduit and is discharged from outlet opening 216 of the conveyance conduit into separator chamber 10 previously described.

Because of the fact that the granular catalyst is maintained as a dense upwardly moving compact bed substantially at the static bulk density of the catalyst, the upward velocity and accordingly the residence time of the spent catalyst in the regeneration system is not limited by the height of the conveyer-regenerator or by the velocity of the conveyance-regeneration fluid circulated therethrough, as is the case in the conventional gas-lift or suspended solids systems. Once the conveyance fluid rate is sufficient to exceed the force of gravity and friction on the moving bed, the catalyst will move if continuously fed at the inlet and removed from the outlet. Any necessary increases in conveyance-regeneration fluid rate necessary to remove heat from the system have absolutely no effect whatsoever upon the residence time of the catalyst in the system or the degree to which it is regenerated and the only external effect is one of somewhat increased pressure differential.

Accordingly, in the present process the spent catalyst may be completely regenerated by the removal of the entire quantity of hydrocarbonaceous deactivating materials during conveyance. In the present example, this is accomplished by utilizing an oxygen concentration of about 1.5% at the inlet of the conveyance-regeneration zone. The spent catalyst contains about 4.1% carbon and is discharged into separator 10 after regeneration containing less than about 0.1% carbon and the restoration of activity is essentially 100%.

In the apparatus of this invention, the entire structure above grade level is about 55 feet in height, the reactor column diameter is 4 feet 6 inches, and the conveyance-regeneration conduit is 14-inch schedule 40 pipe. The catalyst is circulated at a rate of 10.3 tons per day and moves at an upward velocity of 15.5 feet per hour through the conveyance-regeneration conduit. This low velocity is totally impossible to maintain in a gas-lift or pneumatic suspension conveyer, and herein it permits the complete regeneration of the catalyst during the lifting step.

Referring now to Figures 2, 3, and 4, the structural details of recycle gas injection zones 34 and 38 are shown. These figures will be described simultaneously and in each equivalent elements are designated by the same numbers.

In Figure 2 is shown a partial plan view of the structure employed for injecting the recycle gas used for temperature control within column 12, and Figures 3 and 4 are elevation views taken at right angles to each other and in whole or partial cross section of the apparatus. This structure consists of inlet 250 which continues as manifold conduit 252, flanged for ready assembly and disassembly, substantially entirely across a diameter of column 12. The opposite end 254 is closed. Extending laterally at right angles from manifold conduit 252 are 4 pairs of parallel and horizontal branch conduits 256, 258, 260, and 262. These conduits also are closed at their ends. Disposed at intervals along the upper surfaces of these branch conduits are nozzles 264 each of which opens upwardly directly into the lower opening of a diffusion and mixing conduit 266.

Supported above each of the parallel branch conduits referred to previously are four parallel elongated channels 268, 270, 272, and 274. These channels are closed at their ends and have the shape of an inverted trough so that the solids pass downwardly around them forming within the trough an empty space termed a re-engaging zone 276 shown more clearly in Figures 3 and 4. These first inverted troughs or channels are each supported at their ends substantially at the walls of column 12 on angle bracket 278.

Disposed immediately below the first inverted troughs and supported therefrom by means of brackets 280 and 282 are second inverted V-shaped troughs 284, 285, 287, and 289, one each disposed above each of the branch conduits and below each of the first V-shaped troughs. The inverted troughs and the branch conduit corresponding thereto are all arranged parallel and in vertical alignment with one another and extend substantially entirely across column 12.

The purpose of the second inverted trough is two-fold: first, to support the diffusion and mixing conduits 266 in vertical alignment with the nozzles 264, and second, to provide an empty solids-free fluid disengaging zone within which a relatively low pressure is maintained by the action of the fluid jets issuing from each nozzle 264.

As the solids pass downwardly as a moving bed by gravity around the structure described above, they flow in a pattern illustrated at the left-hand side of Figure 3 in which a downwardly moving solids bed 286 is illustrated. The operation described in connection with this part of Figure 3 also occurs at each of the disengaging-engaging zones shown in that figure. The injection fluid, such as hydrogen, passes successively through inlet 250, through manifold conduit 252, then through each of the branch conduits such as 262 into each of the nozzles 264. The combination of the nozzle 264 and its vertically aligned diffusion and mixing conduit 266 forms a jet pump type of structure. The jet of hydrogen or other injected fluid issuing from nozzle 264 passes directly into the lower opening of the diffusion and mixing conduit aligned therewith and establishes and maintains a relatively low pressure within reaction fluid disengaging zone 288 which is formed below the second inverted trough 284. Due to this decreased pressure at least a portion of the fluid being contacted by the moving bed of solids 286 below disengaging zone 288 is disengaged through solids interface 290 and enters the low pressure or disengaging zone 288. Herein the fluid is drawn by the jet into diffusion and mixing conduit 266 and ejected into mixture re-engaging zone 276 formed by the upper or first inverted trough 274. Within diffusion and mixing zone 266 and mixture re-engaging zone 276 the reactant fluids are turbulently mixed with the injected fluid stream effecting a uniform concentration of ingredients and causing a desired temperature change discussed above. The fluid mixture thus formed passes downwardly through re-engaging zone 276 around diffusion and mixing zone 266 and is engaged with the granular solid contact material by passing through solids interface 292 from which point they continue, at least in part, in the normal direction through the moving bed of contact material.

It should be noted that the flow of fluids in the catalyst contacting zones adjacent to the fluid injection structure may be in either direction depending upon the degree of pressure decrease maintained by the operation of nozzles 264 in disengaging zone 288. If this pressure is quite low relative to the reaction pressure, substantially all of the reacting fluids are drawn into disengaging zone 288, mixed with injected fluid, and re-engaged with the solids from re-engaging zone 276 through solids interface 292 and at least a portion of the fluid mixture may pass downwardly with the solids and re-enter disengaging zone 288 as an internal recycle. If the pressure maintained in disengaging zone 288 is only moderately below that of the contacting zone pressure, only a primary portion of the reacting fluids is disengaged into disengaging zone 288, the secondary portion passes upwardly countercurrently to the solids, and is mixed with re-engaged mixture of the primary portion and the injected fluid adjacent solids interface 292.

The extremities of branch conduits 256, 258, 260, and 262 are supported in the manner shown in Figures 3 and 4 wherein a gusset plate 294 attached to the inner walls of the lower inverted trough are provided with dependent bolts 296 carrying a transverse supporting bracket 298. The support thus derived ultimately depends from angle bracket 278.

A plurality of transverse strengthening gussets 300 is provided at spaced intervals along the length of and extending between the inner walls of the upper inverted troughs as shown in Figures 2 and 3.

Especially designed insulated seal 302 is provided at the point where inlet 250 enters column 12. This seal is detailed in Figure 3 wherein outer shell 304 is integrally attached to inlet 250 as well as to column 12 and the annulus therebetween is filled with a packing and sealing material 306 consisting of an insulating cement. The purpose of the insulated seal is to protect the column shell from high temperature effects when high temperature fluids are injected as in the example of Figure 1 above.

From the foregoing description of Figures 2, 3, and 4, it is apparent that the recycle gas injection structure consists of a plurality of parallel upper inverted troughs, a plurality of parallel lower inverted troughs disposed one each below and in vertical alignment with an upper inverted trough, and a plurality of elongated parallel branch conduits disposed parallel and below each of the lower inverted troughs. The lower inverted troughs support a series of vertically disposed diffusion and mixing conduits, and a nozzle opening from the branch conduits is disposed immediately below and in vertical alignment with each diffusion and mixing conduit. The injected fluid is introduced under pressure through a manifold conduit into each branch conduit, is discharged as a plurality of upwardly directed streams or jets from the nozzles directly into the diffusion and mixing conduits creating the low pressure zone below the lower inverted troughs and effecting the disengagement of at least part of the fluids being contacted, the mixing of the injected gas therewith, and the re-engagement of the mixture thus formed at a point immediately below the lower edge of the upper inverted troughs.

In the apparatus described by way of illustration in connection with Figure 1, the actual structure of the fluid injection device included a plurality of 4 parallel upper inverted troughs each provided with a lower inverted trough and a pair of branch conduits immediately below substantially as shown in Figures 2, 3, and 4. The 4 parallel sets of elements were spaced on 12-inch centers in a contacting column 4 feet 6 inches in inside diameter, the manifold conduit was 3-inch schedule 80 pipe, the branch conduits were 2-inch schedule 80 pipe, the over-all height of the upper inverted trough was 10 inches and its inside width was 6 inches, the over-all height of the lower inverted trough was about 6.5 inches and the lower width was 6 inches, the included upper angles of each inverted trough being about 50°. A plurality of 20 nozzles and 20 diffusion and mixing conduits were employed, the total of 6 each being used on the middle pair of branch conduits and 4 each on the outside pair of branch conduits.

In the gasoline reforming system described in connection with Figure 1 in which hydrogen was injected at a temperature of 1150° F. in order to maintain an average reaction temperature of between about 870° F. and 900° F., it was found that a substantially uniform temperature profile throughout the reactor was maintained, no noticeable hydrocarbon coking occurred on the internal surfaces of the injection structure in spite of the very high temperature of the injected hydrogen, and that no noticeable hydrocarbon coking or decomposition occurred in the catalyst immediately adjacent the injection device.

Obviously the injection and mixing process and apparatus above described can be employed with equal facility to the injection of fluids which are colder as well as hotter than the desired average temperature in the contacting column. Colder fluids are injected to control exothermic processes or to decrease the reaction temperature to a lower level in part of the solids bed and hotter fluids being injected to control endothermic processes or to raise the reaction temperature to a higher level in part of the solids bed.

Although the present invention has been described in considerable detail above with respect to gasoline or naphtha reforming, it should be understood that the principles of this invention and the advantages accruing therefrom are equally obtainable in any other hydrocarbon conversion process in which a recirculating granular contact material which requires regeneration is employed. It is therefore not intended to limit this invention to gasoline reforming specifically but on the contrary the invention relates to fluid-solids contact processes in general.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a solids-fluid contacting process wherein a first fluid stream is passed through a compact bed of granular solids in a contacting zone, and a second fluid is injected into the contacting zone at an intermediate point for admixture with said first fluid, the improved method for injecting said second fluid and admixing it with said first fluid before contacting said granular contact material, which comprises establishing at least two superimposed solids-free void spaces within said contacting zone with an open-ended conduit extending through said contact material connecting said two void spaces and terminating in their respective interiors, one of said void spaces being located upstreamwardly with respect to said first fluid stream and the other downstreamwardly therefrom, each of said void spaces communicating with separate interfacial areas of said contact material, introducing said second fluid as an unconfined jet directly into the extremity of said conduit located in said upstreamward void space thereby creating a low pressure zone in said upstreamward void-space and causing a part of said first fluid to be disengaged from the adjoining interface of contact material and to flow in turbulent admixture with said second fluid through said conduit and into said downstreamward void space where the gaseous mixture is re-engaged at the adjoining interface of contact material, and fluid flow is continued through said contact material.

2. In a catalytic contacting process wherein a hydrocarbon feed stream is passed through a compact bed of granular catalyst in a contacting zone to effect endothermic conversion with resultant temperature decreases, and a second gas stream is injected into the contacting zone at an intermediate point for admixture with said feed stream, and wherein said second gas stream is preheated to a temperature higher than the desired temperature in said contacting zone to compensate for endothermic heat losses, the improved method for injecting said second gas stream and admixing it with said feed stream before contacting said catalyst, which comprises establishing at least two superimposed solids-free void spaces within said contacting zone with an open-ended conduit extending through said catalyst bed connecting said two void spaces and terminating in their respective interiors, one of said void spaces being located upstreamwardly with respect to said feed stream and the other downstreamwardly therefrom, each of said void spaces communicating with separate interfacial areas of said catalyst, introducing said second gas stream as an unconfined jet directly into the extremity of said conduit located in said upstreamward void space, thereby creating a low pressure zone in said upstreamward void space and causing a part of said feed fluid to be disengaged from the adjoining interface of catalyst and to flow in turbulent admixture with said second gas stream through said conduit and into said downstreamward void space where the gaseous mixture is re-engaged at the adjoining interface of catalyst, and fluid flow is continued through said contact zone.

3. A process as defined in claim 2 wherein said feed stream comprises a low grade naphtha and conditions of temperature and pressure are maintained in said contacting zone to effect reforming thereof, and wherein said second gas stream is essentially hydrogen.

4. An apparatus adapted for admixing and distributing a second fluid material with a first fluid stream being contacted with a granular bed of solid contact material, which comprises a manifold inlet conduit for said second fluid, a plurality of branched conduits communicating with said manifold conduit, a plurality of nozzles opening from said branched conduits, a lower inverted channel disposed above and parallel to each branched conduit, an upper inverted channel disposed above and parallel to said lower channel, a plurality of diffusion and mixing conduits open at both ends, one end being aligned with each of said nozzles and extending from a point spaced adjacent and apart from the respective nozzle through said lower inverted channel to a point below said upper inverted channel, said branched conduits being disposed in substantially the same plane.

5. In an apparatus for contacting a fluid with a granular solid contact material which comprises a contacting column containing the granular solid contact material, an inlet and an outlet for passing a fluid through said column to contact said granular material, and at least one intermediate inlet for fluid opening into said column at a point intermediate its ends for the introduction of additional fluid for admixture with said fluid passing therethrough, the improvement which comprises an intermediate fluid injection and mixing means comprising a manifold conduit within said column and communicating with said intermediate inlet, a plurality of branch conduits communicating with said manifold conduit, a plurality of nozzles uniformly distributed throughout the cross section of said column and each communicating with a branch conduit, a lower inverted channel disposed above and parallel to each branch conduit, an upper inverted channel disposed above and parallel to said lower channel, a plurality of diffusion and mixing conduits open at both ends, one aligned with each of said nozzles and extending from a point spaced adjacent and apart from the nozzle through said lower inverted channel to a point below said upper inverted channel, and means to control the flow rate of fluid injected through said intermediate inlet to disengage fluid from said solids into the free space below said lower inverted channel, mix it with the injected fluid in said diffusion and mixing conduits, and re-engage the mixture with said solids from the free space below said upper inverted channel.

6. An apparatus according to claim 5 in combination with means for supporting each upper inverted channel at its ends from the inner surface of said column, means for supporting each of said lower inverted channels from the upper inverted channel immediately above it, and means for supporting each of said branch conduits at their ends from the lower inverted channel immediately above it.

7. An apparatus according to claim 5 wherein said manifold conduit extends from said intermediate inlet substantially across said column along a diameter thereof and is closed at the other end, said branch conduits extend at right angles from said manifold conduit to closed ends adjacent the wall of said column, said nozzles open upwardly from the top of said branch conduits, and said diffusion and mixing conduits are disposed vertically above and aligned one each with each of said nozzles.

8. An apparatus according to claim 5 wherein said column is provided with a plurality of intermediate fluid inlets opening into said contacting column along the length thereof, each of said intermediate fluid inlets communicating with one of said additional fluid injection and mixing means disposed within said column.

9. An apparatus according to claim 5 in combination with an inlet for solid granular contact material at the top of said column, an outlet for said material at the bottom of said column, and means communicating said outlet with said inlet for regenerating and recirculating said contact material.

10. In an apparatus for contacting a downwardly moving bed of granular solid contact material with a fluid which comprises a vertically disposed elongated contacting column, a lower outlet therefrom for spent solids opening into a solids regenerator vessel which in turn communicates with the solids inlet at the top of said column, a fluid inlet near the bottom of said column, a fluid outlet near the top of said column, and at least one intermediate fluid inlet opening into said column between said fluid inlet and outlet, the improvement which comprises an intermediate fluid injection and mixing means disposed within said column at a point adjacent each of said intermediate fluid inlets, said injection and mixing means comprising a plurality of horizontal upper inverted channels having closed ends arranged parallel to each other and supported at the column walls, a plurality of horizontal lower inverted channels having closed ends and supported one each below each of said upper inverted channel, a plurality of vertical open ended diffusion and mixing conduits integrally attached to and spaced along the length of each of said lower inverted channels and having their lower open ends below the top of said lower inverted channel and their upper open ends disposed below the top of the upper inverted channel immediately above, a plurality of horizontal branch conduits closed at their ends adjacent the inner surface of said column disposed one each below and parallel to each of said lower inverted channels, a nozzle opening upwardly from each branch conduit at a point directly below and spaced apart from the lower open end of each of said diffusion and mixing conduit, a manifold conduit communicating each of said branch conduits with one of said intermediate fluid inlets, and means for controlling the rate of flow of fluid through said intermediate fluid inlet to create a relatively low pressure within the open space below each lower inverted channel and through which the branch conduits extend by means of the jet of high velocity fluid issuing from each nozzle into the diffusion and mixing conduit aligned therewith, thereby drawing fluids from the bed of solids in said contacting column below the injection and mixing means into the free space below said lower inverted channels, mixing it with the fluid from said nozzles in said diffusion and mixing conduits out of contact with said solids, and passing the mixture therefrom through the free space below said upper inverted channels and into the bed of solids within said column above said injection and mixing means.

11. An apparatus according to claim 10 wherein the lower opening of each of said diffusion and mixing conduits are flared.

References Cited in the file of this patent

UNITED STATES PATENTS

| | | |
|---|---|---|
| 2,335,610 | Plummer | Nov. 30, 1943 |
| 2,349,045 | Layng et al. | May 16, 1944 |
| 2,418,672 | Sinclair et al. | Apr. 8, 1947 |
| 2,482,138 | Schutte | Sept. 20, 1949 |
| 2,534,025 | Howes | Dec. 12, 1950 |
| 2,561,334 | Bowles et al. | July 24, 1951 |
| 2,689,821 | Imhoff et al. | Sept. 21, 1954 |
| 2,809,922 | Berg et al. | Oct. 15, 1957 |